(12) United States Patent
Lloyd

(10) Patent No.: US 6,663,433 B1
(45) Date of Patent: Dec. 16, 2003

(54) CONNECTOR DEVICE FOR CONNECTING A SMART CARD TO A COMPUTER

(75) Inventor: Tim Lloyd, Berkshire (GB)

(73) Assignee: Schlumberger Systemés (FR)

(*) Notice: Subject to any disclaimer, the term of this patent is extended or adjusted under 35 U.S.C. 154(b) by 0 days.

(21) Appl. No.: 10/129,598
(22) PCT Filed: Nov. 10, 2000
(86) PCT No.: PCT/EP00/11147
§ 371 (c)(1), (2), (4) Date: Aug. 14, 2002
(87) PCT Pub. No.: WO01/35319
PCT Pub. Date: May 17, 2001

(30) Foreign Application Priority Data

Nov. 11, 1999 (GB) .............................................. 9926720

(51) Int. Cl.$^7$ ............................................... H01R 24/00
(52) U.S. Cl. ........................................ 439/630; 439/923
(58) Field of Search ................................ 439/630, 923, 439/159, 160

(56) References Cited

U.S. PATENT DOCUMENTS

| | | | | |
|---|---|---|---|---|
| 4,975,805 A | * | 12/1990 | Schmutzler | 439/160 |
| 5,674,080 A | * | 10/1997 | Takemura | 439/159 |
| 5,906,516 A | * | 5/1999 | Sato et al. | 439/630 |
| 5,934,920 A | * | 8/1999 | Ito et al. | 439/159 |
| 6,027,350 A | * | 2/2000 | Chen et al. | 439/159 |

* cited by examiner

Primary Examiner—Tho D. Ta
(74) Attorney, Agent, or Firm—Leonard W. Pojunas; John Ryberg

(57) ABSTRACT

A connector device for connecting a smart card to a computer comprises a receptacle having an upwardly facing opening for receiving the card. The receptacle contains spring contacts which establish electrical contact with the card contacts, and which serve to connect the card contacts to the computer, and is provided with a projection adjacent the opening to facilitate one-handed withdrawal of the card from the receptacle.

6 Claims, 2 Drawing Sheets

CONNECTOR DEVICE FOR CONNECTING A SMART CARD TO A COMPUTER

FIELD OF THE INVENTION

This invention relates to connector devices, and is more particularly concerned with connector devices for connecting electronic memory cards, known as smart cards, to general purpose computers such as personal computers (PCs).

1. Background of the Invention

Smart cards, that is plastic cards incorporating an electronic memory (or a microprocessor associated with such a memory), are becoming increasingly widely used in an increasing variety of applications. For example, they are used as credit cards, as security access devices, and for the storage of medical records. Usually, each type is used in association with a dedicated card reader. However, it is also becoming increasingly desirable that such cards should be readable and/or programmable via a conventional general purpose computer such as a PC. It is therefore an object of the present invention to provide a simple and inexpensive connector device suitable for establishing connection between a smart card and such a computer.

2. Summary of the Invention

According to the present invention, there is provided a connector device for connecting a smart card having electrical contacts to a computer, the connector device comprising a base, a body projecting upwardly from the base and defining a receptacle for receiving a portion of the smart card having the electrical contacts whereby another portion of the smart card remains outside the receptacle, the receptacle having an upwardly facing opening for receiving the portion of the smart card having the electrical contacts, the receptacle containing resilient electrical contacts for making resilient electrical contact with at least some of the electrical contacts of the smart card when said portion of the smart card is in the receptacle, and a plurality of conductors each having one end electrically connected to a respective one of the receptacle contacts and the other end connected to a connector adapted to co-operate with a port of the computer, wherein the body is provided with a projecting member which projects upwardly from one side of the opening, the projection member having a main face that is substantially face-to-face with a main face of the smart card when the smart card is inserted in the connector device, the projection member being shaped to facilitate one-handed withdrawal of the smart card from the receptacle.

It will be appreciated that the resilient receptacle contacts tend to grip the card by virtue of their resilience, so that it would normally be necessary to hold the connector device with one hand while withdrawing the card with the other. However, by virtue of the present invention, the card can be withdrawn with one hand, by gripping the card between thumb and forefinger of one hand, and then withdrawing it while pressing down on the top of the projecting member with the middle finger of the same hand.

In this specification, the term "computer" is intended to include not only a stand-alone computer of the PC or Mac type, but also a laptop or similar version of such a computer and a computer of the type comprising at least one computer workstation connected to a central processor.

Preferably the projecting member is provided at its top with a substantially flat region to which downward pressure can be applied as the card is withdrawn.

The connector is preferably a standard serial connector, in particular a universal serial bus (USB) connector, adapted to fit the corresponding serial port of the computer.

In a preferred embodiment of the invention, the receptacle contacts are formed by respective convexly curved resilient conductors which are mounted on an insulating support so as to project into the path of the card as it is inserted into the receptacle. The insulating support may be, or may co-operate with, a printed circuit board having a plurality of conductive tracks thereon, each track serving to electrically connect a respective one of said resilient conductors to a respective one of said plurality of firstmentioned conductors.

BRIEF DESCRIPTION OF THE DRAWINGS

The invention will now be described, by way of example only, with reference to the accompanying drawings, of which.

DETAILED DESCRIPTION

Figure 1:
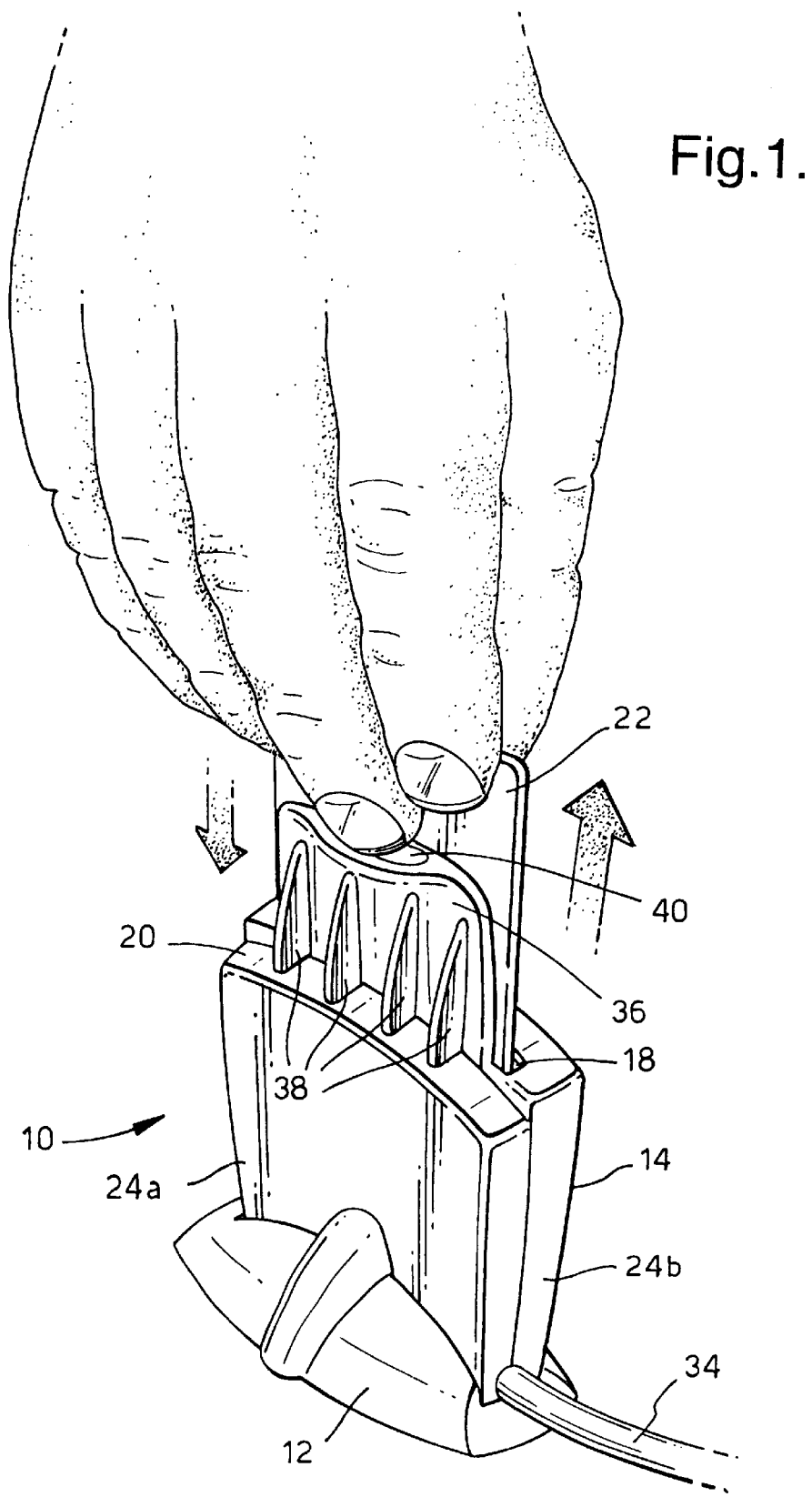
FIG. 1 is a perspective view of a connector device in accordance with the present invention for connecting a smart card to the USB port of a computer.

The connector device of FIG. 1 is indicated at 10, and comprises a flat base 12 and a hollow body 14 projecting upwardly from the base. The body 14 is substantially rectangular in cross-section, and has an upwardly facing opening or slot 18 in its upper surface 20 for receiving the portion or end of a smart card 22 having the electrical contact of the card in its surface: thus the body 14 forms a receptacle into which the smart card 22 can be inserted.

Figure 2:
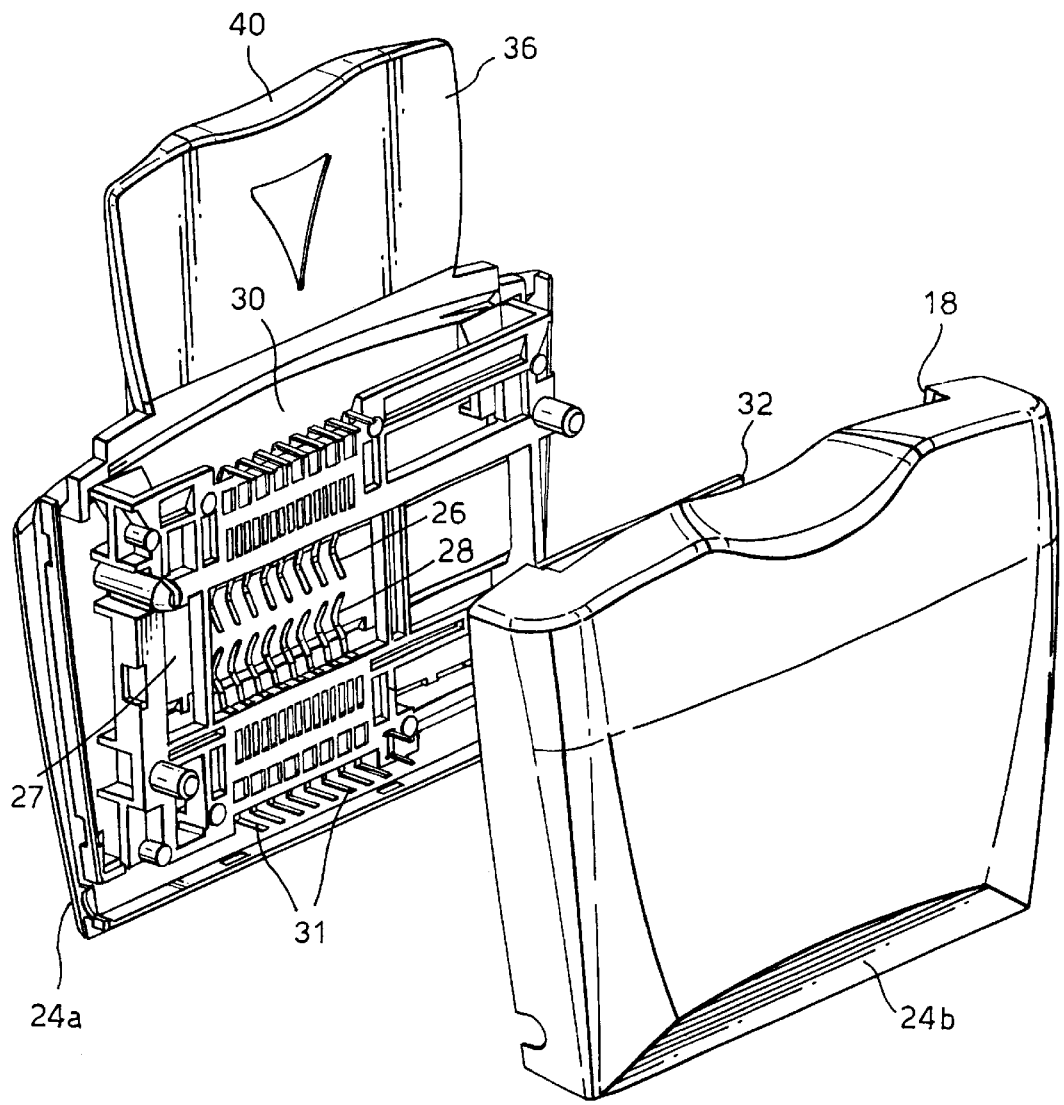
FIG. 2 is an exploded view of the connector device of FIG. 1.

The base 12 and body 14 are moulded in a suitable plastics material, in two parts 24a and 24b, which mate in a plane containing the opening or slot 18, as best seen in FIG. 2: typically, the two parts 24a and 24b simply snap together.

The body 14 contains a plurality of resilient or springy electrical contacts 26 mounted in an insulating support 27 which fits and is held between the two parts 24a and 24b of the body. Each contact has a convexly curved portion 28 which is disposed in the path followed by the smart card 22 as it is inserted into the opening or slot 18, this path being effectively defined by a flat guide surface 30 extending downwardly within the body 14 from the opening or slot 18. Thus as the portion of the smart card 22 containing the contacts of the card is pushed into the receptacle defined by the body 14, the resilient receptacle contacts 26 are pushed to one side, but are urged into contact with the card by their resilience. The receptacle contacts 26 are positioned such that when the card is fully pushed into the receptacle defined by the body 14, as shown in FIG. 1, some of the contacts 26 are urged into contact with the card contacts. It should be noted that there are more receptacle contacts 26 than card contacts, to cater for cards having card contacts in various different positions.

The ends 31 of the receptacle contacts 26 remote from the curved portions 28 project perpendicularly from the plane of the support 27, and are received in respective holes in a printed circuit board 32 having a respective conductive track for each receptacle contact 26. Those of the tracks associated with receptacle contacts 26 in use in particular smart card application are connected to respective wires of a flying lead 34 (see FIG. 1), whose other end is connected to a USB serial connector (not shown), which plugs into the USB serial port of a computer such as a PC.

To facilitate one-handed use of the connector device 10, the body part 24a containing the flat guide surface 30 is provided in accordance with the present invention with an integral, upwardly projecting, substantially rectangular and planar member 36, which extends along substantially the whole width of one side of the opening or slot 18. The member 36 is inclined slightly away from the plane in which the smart card 22 lies when it is inserted into the opening or slot 18, and is supported by four spaced apart buttress-like members 38 which extend between the rear surface of the member 36 (ie the surface remote from the opening or slot 18) and the body part 24a and which are formed integrally with the member 36 and the body part 24a. Additionally, the member 36 is provided in the middle of its upper edge with an integrally formed, rearwardly projecting, slightly concave, surface 40 sized to receive the end of a finger.

In use, the smart card 22 is inserted into the receptacle defined by the body 14 of the connector device 10, whereupon its contacts are connected via the relevant receptacle contacts 26, the tracks on the PCB 32, the flying lead 34 to the USB serial connector. The USB serial connector is then plugged into the USB serial port of the computer, whereupon the smart card 22 can be read and/or written to via the computer.

As already indicated, the resilience of the receptacle contacts 26 urges them into contact with the contacts of the smart card 22, so that the receptacle contacts tend to grip the card. Absent the present invention, therefore, in order to withdraw the smart card 22 from the connector device 10, it would be necessary to hold the connector device with one hand while withdrawing the card with the other. However, with the present invention, in order to withdraw the smart card 22 from the connector device 10, it is merely necessary to grip the top of the card between the forefinger and thumb of one hand, and to press down on the surface 40 with the middle finger of the same hand while withdrawing the card.

Several modifications can be made to the described embodiment of the invention. For example, the insulating support 27 and the printed circuit board 32 can be replaced by a single component performing the functions of both.

What is claimed is:

1. A connector device for connecting a smart card having electrical contacts to a computer, the connector device comprising a base, a body projecting upwardly from the base and defining a receptacle for receiving a first portion of the smart card having the electrical contacts whereby a second portion of the smart card remains outside the receptacle, the receptacle having an upwardly facing opening for receiving the portion of the smart card having the electrical contacts, the receptacle containing resilient electrical contacts for making resilient electrical contact with at least some of the electrical contacts of the smart card when said portion of the smart card is in the receptacle, and a plurality of conductors each having one end electrically connected to a respective one of the receptacle contacts and the other end connected to a connector adapted to co-operate with a port of the computer, wherein the body is provided with a projecting member which projects upwardly from one side of the opening, the projecting member having a planar face that is substantially face-to-face with a planar face of the second portion of card when the smart card is inserted in the connector device, the projection member being shaped to facilitate one-handed withdrawal of the smart card from the receptacle.

2. A connector device as claimed in claim 1, wherein the projecting member is provided at its top with a substantially flat region to which downward pressure can be applied as the card is withdrawn.

3. A connector device as claimed in claim 1, wherein the connector is a standard serial connector adapted to fit the serial port of the computer.

4. A connector device as claimed in claim 3, wherein the connector is a USB serial connector.

5. A connector device as claimed claim 1, wherein the receptacle contacts are formed by respective convexly curved resilient conductors which are mounted on an insulating support so as to project into the path of the card as it is inserted into the receptacle.

6. A connector device as claimed in claim 5, wherein the insulating support is, or co-operates with, a printed circuit board having a plurality of conductive tracks thereon, each track serving to electrically connect a respective one of said resilient conductors to a respective one of said plurality of firstmentioned conductors.

* * * * *